3,437,731
METHOD OF RELIEVING EXAGGERATED
UTERINE CONTRACTIONS
Josef Schmitt, L'Hay-les-Roses, and Marcel Daniel Pierre Brunaud, Paris, France, assignors to Etablissements Clin-Byla, Paris, France, a French company
No Drawing. Original application June 22, 1964, Ser. No. 377,070. Divided and this application Feb. 9, 1967, Ser. No. 643,749
Claims priority, application France, June 28, 1963, 939,795
Int. Cl. A61k 27/00; C07c 93/06, 91/16
U.S. Cl. 424—330                                     1 Claim

ABSTRACT OF THE DISCLOSURE

Method of relieving exaggerated uterine contractions by administering the B forms of N-(2-phenyl-1-methylethyl) 2-phenoxy-1-methylethylamine.

---

This application is a division of my copending application, Ser. No. 377,070, filed June 22, 1964.

This invention relates to a secondary amine which is a substituted benzedrine, to the production thereof and to compositions containing the same.

Apart from its intensive peripheral vasodilative properties which give it its therapeutic indications, isoxsuprine of Formula I

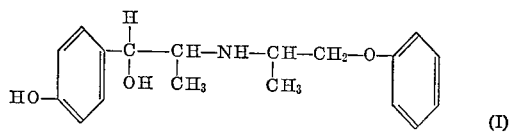

has a very advantageous uterus-relaxing activity. However it is difficult to make use of this activity clinically because of the excessive activity of the product on the cardiovascular system.

The object of the present invention is to dissociate these two activities on molecules of a structure resembling that of isoxsuprine and to obtain substances having a reduced vasodilative activity but a uterus-relaxing activity.

The invention provides N-(2-phenyl-1-methylethyl) 2-phenoxy-1-methylethylamine having the formula

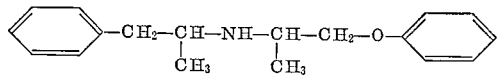

and acid addition salts thereof. The said amine may be prepared by the reduction, catalytic or otherwise, of the oxime obtainable by the reaction between a benzedrine and phenoxyacetone in stoichiometric proportions. Since benzedrine has an asymmetric carbon atom any form of benzedrine may be used.

The invention also provides a pharmaceutical composition in dosage unit form comprising 2 to 500 mgm. of at least one isomeric form of N-(2-phenyl-1-methylethyl) 2-phenoxy-1-methylethylamine, or an acid addition salt thereof containing a corresponding amount of the amine, together with an excipient.

The compound of the invention has two asymmetric carbon atoms so that there must exist two distinct disastereo-isomeric forms (threo and erythro) each of which, because of the asymmetry of the molecule, can be resolved into optical antipodes. We have therefore synthesised six different substances (four substances which rotate the plane of polarised light and two racemates) since a priori it might be expected that each stereoisomeric form as well as each of the optical isomers would have different physiological activities.

To synthesise the various products having the above formula benzedrine and phenoxy acetone can be reacted according to the present invention to produce the imine having the formula

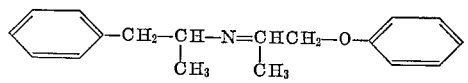

This imine is then reduced, for example by a chemical reducing agent of the mixed hydride group, more particularly sodium borohydride or potassium borohydride, or otherwise catalytically, more particularly in the presence of palladium on charcoal.

The intermediate imine which is rather unstable on heating, has not been isolated in the pure state. It can be reduced directly within the reaction mixture as it is formed. The formation of the imine may be carried out in a lower aliphatic alcohol, methanol and ethanol being preferred for this purpose. However, in a modification of the process, to ensure that the imine has been formed quantitatively before reduction, the water forming during the reaction can be entrained by an inert entraining agent, preferably benzene. If the water resulting from the imine formation is not entrained, it is preferable to use a considerable excess of benzedrine to avoid undesirable reduction of some of the phenoxyacetone before condensation. This excess of benzedrine can easily be recovered by fractional distillation of the reduction product and be reused in a subsequent operation.

In every case a mixture is obtained of the two diastereoisomeric forms, the proportions of which will vary with the temperature at which the imine is formed and the method of carrying out the reduction.

The two disastereoisomeric bases can easily and rapidly be distinguished by chromatography on a thin layer of silica using as the solvent mixture: benzene 50, ethyl acetate 50 and absolute ethanol 10 parts by volume and subsequent development by spraying with Dragendorff's reagent. The two diasteroisomeric bases then give stains whose Rf values are respectively in the neighbourhood of 0.59 and 0.51. From the intensity and size of the stains it is possible to obtain a quantitative indication of the composition of the mixture.

For example, catalytic reduction of the imine gives a mixture of substantially equal parts of the two diastereoisomers. On the other hand, reduction of the imine by the borohydride results in a mixture containing approximately 70% of the isomer having an Rf value of 0.59 and 30% of the isomer having an Rf value of 0.51. Finally, formation of the imine in boiling benzene followed by reduction with borohydride gives a mixture of about 60% of the isomer of Rf value 0.59 and 40% of the isomer of Rf value 0.51.

To obtain an adequate rate of reaction the catalytic reduction may be carried out in ethanol at a temperature of about 50° C. under ordinary pressure whilst reduction using a borohydride can be carried out in a lower aliphatic alcohol, especially methanol, at a temperature of between 0 and 30° C.

The preparative separation of the two diastereoisomeric forms may be carried out by fractional crystallisation of their salts. The acid fumarates and the hydrochlorides being particularly suitable for this separation.

Thus, in a mixture of the two forms the acid fumarate of the form having an Rf value of 0.59 crystallises initially because of its lower solubility. The hydrochlorides, on the other hand, behave in the opposite way. Thus by alternate formation and crystallisation of these two salts the two forms can be isolated in the pure state from a mixture thereof. The form having an Rf value of 0.59 is generally obtained more easily.

If either d- or l-benzedrine is used instead of dl-benzedrine, the optical antipodes of the two diastereoisomers are isolated in the same way, their physical properties being very similar to those of the racemic forms, with the anticipated exception of the rotatory power.

Apart from their Rf values in thin-layer chromatography, the two diastereoisomeric forms are also distinguished by their infra-red spectra in the fingerprint region both on the base and on the salts and also by their nuclear magnetic resonance spectra.

The nuclear magnetic resonance spectra were recorded at 60 m./cs. on a Varian A 60 spectrograph, tetramethyl silane being used as internal reference.

Isomer A (Rf 0.51)

Between 6.7 and 7.4 p.p.m. there is a group of peaks due to the aromatic protons.

At about 3.8 p.p.m. there is a group of two protons attributed to the

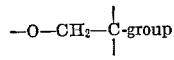
−O−CH$_2$−C-group

At about 3 p.p.m. there is a group of peaks due to two tertiary protons.

At 1.55 p.p.m. there is a peak attributable to the NH group.

Finally, between 0.9 and 1.2 p.p.m. there are two doublets due to the two methyl groups.

Isomer B (Rf 0.59)

The spectrum of the isomer B (Rf 0.59) is very similar to that of the isomer A apart from very slight differences in the shape of the peaks, with the exception of the peak attributable to the NH group which is found at 1.35 p.p.m. instead of 1.55 p.p.m.

The absolute configuration of the two forms was not determined exactly. However, there is presumptive evidence that the form having the Rf value 0.59 corresponds to the threo form and that the isomer having the Rf value 0.51 corresponds to the erythro form.

The melting points and rotatory powers are shown in the following table:

The ether is evaporated on a water bath under reduced pressure and the residue is distilled in a Claisen flask. After the low boiling products have distilled a yellow liquid is obtained (44 g.); boiling point=135–145° C./0.05 mm.

The mixture is distilled a second time in a Claisen flask. There is thus obtained 40 g. of a yellow liquid; boiling point=132–135° C./0.05 mm.

When subjected to thin-layer chromatography the mixture is found to be approximately 30% isomer A (Rf value=0.51) and 70% isomer B (Rf value=0.59).

Separation of isomer B 38.4 g. of the yellow liquid obtained as described above and 16.5 g. of fumaric acid are dissolved in 275 ml. of boiling absolute alcohol. On cooling a colourless solid separates (38 g.); melting point 147–154° C. Recrystallisation of the solid from 9 volumes of absolute alcohol gives 24 g. of fumarate; melting point 162° C.

Thin-layer chromatographic examination on the base liberated from this fumarate indicates that it is the fumarate of the pure isomer B.

Liberation of the base from this fumarate enables the pure hydrochloride of the isomer B to be prepared therefrom by the action of hydrochloric gas in alcohol; melting point=156–157° C.

Separation of isomer A

The mother liquors from the formation and recrystallisation of the fumarate of isomer B are evaporated to dryness. The residue obtained is treated with an alkali to liberate the base therefrom and the latter is extracted with ether. The ether solution is washed with water and then dried over sodium sulphate. The ether is evaporated on a water bath and the base obtained is redistilled. The hydrochloride of this base is formed in alcoholic solution and recrystallised several times from the same solvent until a hydrochloride is obtained having a constant melting point (167–168° C.; melting point of a mixture with the hydrochloride of isomer B: 135–143° C.).

| | Rf | Hydrochloride | Acid fumarate | $[\alpha]_D$ base | $[\alpha]_D$ Hydrochloride | $[\alpha]_D$ Fumarate |
|---|---|---|---|---|---|---|
| Isomer: | | | | | | |
| A dl | 0.51 | Melting point,[1] 167–168° | | | $[\alpha]_D^{22°}=+22°$ (0.5% ethanol) | $[\alpha]_D^{20°}=+22°$ (1% ethanol) | |
| A d | 0.51 | Melting point, 190–191° | | | | | |
| A l | 0.51 | Melting point, 189–190° | | $[\alpha]_D^{24°}=-24°$ (1% ethanol) | $[\alpha]_D^{21°}=-21.5°$ (1% ethanol) | |
| B dl | 0.59 | Melting point, 156–157° | Melting point, 162° | | | |
| B d | 0.59 | Melting point, 186–187° | Melting point, 164–165° | $[\alpha]_D^{21°}=+41°$ (1% ethanol) | $[\alpha]_D^{21°}=+22°$ (1% ethanol) | $[\alpha]_D^{20°}=+19°$ (1% ethanol). |
| B l | 0.59 | Melting point, 186–187° | Melting point, 164–164.5° | $[\alpha]_D^{24°}=-41°$ (1% ethanol) | $[\alpha]_D^{21°}=-21.5°$ (1% ethanol) | $[\alpha]_D^{20°}=-15°$ (1% ethanol). |

[1] All the melting points were determined using a capillary tube and are uncorrected; the degrees are degrees C.

The following examples illustrate the preparation of the new compounds.

EXAMPLE 1

A mixture of 60 g. of dl-benzedrine and 30 g. of phenoxy acetone in 200 ml. of methanol is allowed to remain at room temperature for 3 hours.

The mixture is then cooled in a bath of iced water and 3.8 g. of sodium borohydride are added with agitation in small quantities so that the temperature of the mixture remains between 10 and 15° C. After the addition the mixture is allowed to stand for 2 hours with agitation at that temperature.

The methanol is evaporated on a water bath under reduced pressure and the residue is taken up in water and ether. The ether layer is separated and is extracted four times with 200 ml. of hydrochloric acid diluted with nine volumes of water. Since the hydrochloride is not very soluble in water, three layers form. The two lower layers are separated and made alkaline with caustic soda. The liberated base is extracted three times with ether, the solution washed with water, and dried over sodium sulphate.

Thin-layer chromatographic examination of the base liberated from this hydrochloride indicates that it is the hydrochloride of the pure isomer A.

EXAMPLE 2

The same procedure is used as described in Example 1 but the dl-benzedrine is replaced by an equal weight of d-benzedrine, 40 g. of a yellow liquid are obtained after distillation (boiling point 135–140° C./0.05 mm.).

Thin-layer chromatographic examination indicates that the mixture is approximately 30% of isomer A (Rf value 0.51) and 70% of isomer B (Rf value 0.59).

Separation of isomers (a) Isomer B.—The fumarate is formed by dissolving 40 g. of the yellow liquid and 17.2 g. of fumaric acid in 170 ml. of boiling absolute alcohol. A colourless solid slowly separates on cooling. The solid is drained and washed with alcohol; a colourless solid is obtained (28.5 g.) melting at 160–161° C.

Thin-layer chromatographic examination shows that this is the fumarate of the pure isomer B.

A second recrystallisation from alcohol raises the melting point to 164–165° C.; $[\alpha]_D^{20°}=+19°$ (1% in ethanol).

Treatment of this fumarate with alkali in an aqueous solution liberates the base of the pure isomer B; $[\alpha]_D^{21°}=+41°$ (1% in ethanol).

From this base it is possible to prepare the hydrochloride of isomer B. The base is dissolved in ether and is treated whilst agitating with an aqueous solution of hydrochloric acid diluted with two volumes of water. A substantially insoluble hydrochloride precipitates. It is drained, washed with a small quantity of water and is then recrystallised from absolute alcohol. A mat of fine bright colourless needles is obtained, melting at 186–187° C.; $[\alpha]_D^{21°}=+22°$ (10 ethanol).

(b) Isomer A.—The mother liquors from the formation and first recrystallisation of the fumarate of isomer B are evaporated to dryness. The base is liberated by making alkaline with dilute caustic soda and extracting with ether.

The ether solution is washed with water, dried over sodium sulphate and the ether evaporated on a water bath under reduced pressure. The resulting base is distilled. The base is dissolved in ether and the solution is treated with an equimolecular quantity of aqueous hydrochloride acid. The hydrochloride which precipitates is drained and then recrystallised from ethanol. Fine silky colourless needles are obtained which melt at 190–191° C. Melting point of mixture with hydrochloride of isomer B: 160–163° C.; $[\alpha]_D^{20°}=+22°$ (1% in ethanol).

The base liberated from this hydrochloride $$[[\alpha]_D^{22°}=+22°$$

(0.5% in ethanol)] gives a single stain having an Rf value of 0.51 when submitted to thin-layer chromatography.

EXAMPLE 3

The procedure adopted in Example 2 is repeated but the d-benzedrine is replaced by an equal weight of l-benzedrine. A yellow oil is obtained (41 g.); boiling point 136–137° C./0.50 mm.

Thin-layer chromatographic examination indicates that this mixture is about 50% of isomer A (Rf value 0.51) and 50% of isomer B (Rf value 0.59).

The isomers are separated as described in Example 2 with the following results:

Isomer B

Fumarate melting point: 164–164.5° C., $$[\alpha]_D^{22°}=-15°$$

(1% in ethanol)
Hydrochloride melting point: 186–187° C., $$[\alpha]_D^{21°}=-21.5°$$

(1% in ethanol)
Base $[\alpha]_D^{24°}=-41°$ (1% in ethanol)

Isomer A

Hydrochloride melting point: 189–190° C., $$[\alpha]_D^{21°}=-22°$$

(1% in ethanol)
Base $[\alpha]_D^{24°}=-24°$ (1% in ethanol).

EXAMPLE 4

In a three-neck flask provided with a mechanical agitator and a water separator there are placed 60 g. of d-benzedrine, 60 g. of phenoxy acetone and 200 ml. of dry benzene. The mixture is heated to reflux with agitation. Water separates rapidly at first and then more and more slowly. In 2.5 hours 6 ml. of water are obtained and the reaction is practically complete. The benzene is eliminated by heating on a water bath under reduced pressure and then 400 ml. of methanol are added. The solution is cooled in an ice and salt bath and 10.8 g. of potassium borohydride are then added in small portions whilst agitating so that the temperature remains below +2° C. After completion of the introduction of the borohydride the mixture is allowed to stand whilst agitating for 1.5 hours at room temperature. The methanol is removed by heating on a water bath under reduced pressure and the residue is taken up in water and ether. The ether layer is separated, washed with a small quantity of water and dried over sodium sulphate. The ether is removed by heating upon a water bath and the residue is distilled in a Vigreux flask. After a small quantity of low boiling products have passed over a yellow oil is obtained (84 g.); boiling point 143–145° C./0.1 mm.

Thin-layer chromatographic examination reveals that it is a mixture of approximately 40% of isomer A (Rf value 0.51) and 60% of isomer B (Rf value 0.59). The isomers are separated as described in Example 2.

EXAMPLE 5

The same procedure is followed as that described in Example 4 but on reduction with the potassium borohydride the methanol is replaced by an equal volume of ethanol. The reaction is less rapid and after the introduction of the borohydride the mixture has to be left with agitation at room temperature for 5 hours and is then allowed to stand overnight.

After working up in the same way as that described in Example 4 a yellow oil is obtained (72.5 g.); boiling point 140–145° C./0.1 mm.) which when examined by thin-layer chromatography consists of about 40% of isomer A (Rf value 0.51) and 60% of isomer B (Rf value 0.59).

The isomers are separated as described in Example 2.

EXAMPLE 6

30 g. of d-benzedrine and 30 g. of phenoxy acetone are admixed in 300 ml. of ethanol and allowed to stand for 2 hours at ordinary temperature. 3 g. of 5% palladium charcoal are added and the mixture is hydrogenated at 50° C. and ordinary pressure. The absorption is rapid at first and then progressively decreases.

After 4 hours 4865 cc. of hydrogen (theoretically 4480 cc.) has been absorbed and the reaction is practically complete.

After filtration of the catalyst the alcohol is removed by heating on a water bath under reduced pressure and the residue is distilled in a Vigreux flask. After some low boiling materials have passed over a clear yellow oil is obtained (38 g.; boiling point 140–145° C./0.05 mm.) which when examined by thin-layer chromatography is found to consist of about 50% of isomer A (Rf value 0.51) and 50% of isomer B (Rf value 0.59).

Separation of the isomers is carried out in the manner described in Example 2.

Comparison of the pharmacological activity of the six isomers of N-(2-phenyl 1-methyl)-ethyl (2-phenoxy 1-methyl)-ethylamine (hereinafter referred to as 3697 CB)

Techniques adopted:

(I) acute toxicity: toxicity was determined in mice subcutaneously for all the isomers and orally for two of the isomers.

Batches of 10 mice weighing about 20 grams originating from one breed were used.

The different isomers were suspended in water containing 5% of gum, on account of their low solubility at the experimental dosages. The latter varied between 75 and 1000 mg./kg. body weight. The animals are observed for 48 hours after subcutaneous injection and for 72 hours after oral administration.

(II) Action on uterine motoricity. (A) In vitro: a segment of the cornu of the uterus of a rat was suspended in an oxygenated Tyrode bath at 37° C. It was connected to an isotonic myograph recording on a smoke-blackened cylinder. The contractions of the isolated organ are recorded in this way. Solutions of 3697 CB were added to the bath and the changes that they produced in the amplitude of the movements and their frequency as well as upon the basic tone of the organ were studied.

(B) In vivo: after anaesthesia and fixation of the rat and after central laparotomy the top part of a uterine cornu is released by cutting it just below the ovary. The uterus is held stationary and the end of the cornu is fitted in a small chamber and connected to an isotonic myograph. The inside of the chamber is filled with tepid Tyrode's solution to maintain the cornu in a tepid and humid atmosphere. Prior to this, a cannula is fitted in the jugular vein or in the duodenum to enable solutions of 3697 CB to be administered.

The movements of the uterine cornu are then recorded and the changes therein due to the intravenous or intraduodenal administration of solutions of 3697 CB are observed.

(III) Cardiovascular action.—The cardiovascular action of the different isomers of 3697 CB were studied in a cat anaesthetised with Nembutal. The arterial pressure was recorded by manometer in the peripheral end of the carotid. A cannula was fitted in the jugular vein.

The doses injected intravenously varied from 0.01 to 10 mg./kg. Changes in the arterial pressure during injection of increasing doses of the different isomers and variations in the hypertensive effects when 0.001 to 0.004 mg./kg. of adrenalin and noradrenalin injected before and after each dose of 3697 CB were observed.

The action of some of the isomers on the arterial pressure and the mediators were also studied after intraduodenal administration of doses ranging from 0.1 to 50 or 100 mg./kg. of 3697 CB.

Results

Isoxsuprine was used as reference compound for all these tests:

(1) Acute toxicity.
Lethal doses (mg./kg.)

| Isomer: | Subcutaneously | | | Orally | | |
|---|---|---|---|---|---|---|
| | $LD_0$ | $LD_{50}$ | $LD_{100}$ | $LD_0$ | $LD_{50}$ | $LD_{100}$ |
| A dl | <75 | 230 | 600 | | | |
| A d | <75 | 210 | >500 | | | |
| A l | <75 | 400 | >500 | | | |
| B dl | 100 | 200 | 600 | 300 | >500 | >500 |
| B d | 400 | 900 | >1 g | <200 | 500 | >1 g |
| B l | 75 | 250 | >500 | | | |
| Isoxsuprine | 75 | 160 | 225 | 100 | 200 | 300 |

(2) Action on uterine motoricity.
(a) In vitro: uterine cornu of rat suspended in Tyrode's solution.

| Isomer studied | Action on contraction amplitude | | | Action on contraction frequency | | | Action on basic tone (inhibitory threshold (dose)) |
|---|---|---|---|---|---|---|---|
| | Threshold conc. | $EC_{50}$ | $EC_{100}$ | Threshold conc. | $EC_{50}$ | $EC_{100}$ | |
| A d | $1 \cdot 10^{-6}$ | $7.5 \cdot 10^{-6}$ | $1 \cdot 10^{-5}$ | (1) | (2) | (2) | $1 \cdot 10^{-6}$ |
| A d | $1 \cdot 10^{-6}$ | $5 \cdot 10^{-6}$ | $7.5 \cdot 10^{-6}$ | (3) | (3) | $7.5 \cdot 10^{-6}$ | $7.5 \cdot 10^{-6}$ |
| A l | $1 \cdot 10^{-6}$ | $6 \cdot 10^{-6}$ | $2.5 \cdot 10^{-5}$ | $1 \cdot 10^{-5}$ | | $2.5 \cdot 10^{-5}$ | (4) |
| B dl | $1 \cdot 10^{-7}$ | $5 \cdot 10^{-7}$ | $1 \cdot 10^{-6}$ | | | $5 \cdot 10^{-7}$ | $2.5 \cdot 10^{-7}$ |
| B d | $7.5 \cdot 10^{-7}$ | $7 \cdot 10^{-7}$ | $5 \cdot 10^{-6}$ | $2.5 \cdot 10^{-6}$ | | $5 \cdot 10^{-6}$ | $7.5 \cdot 10^{-7}$ |
| B l | $5 \cdot 10^{-7}$ | $2.5 \cdot 10^{-6}$ | $7.5 \cdot 10^{-6}$ | | | $7.5 \cdot 10^{-6}$ | $1.30^{-6}$ |
| Isoxuprine | $0.25 \cdot 10^{-7}$ | $0.5 \cdot 10^{-7}$ | $1 \cdot 10^{-7}$ | 1 to $2.5 \cdot 10^{-8}$ | (3) | (3) | $1 \cdot 10^{-7}$ |

(b) In vivo:

| Isomer studied | Method of administration | Inhibitory dose (mg./kg.) in respect of | | | Observations |
|---|---|---|---|---|---|
| | | Amplitude | Frequency | Tone | |
| A d | ID | >20 | >20 | >20 | 1 experiment. |
| A l | ID | 50 | 50 | (3) | Do. |
| B dl | IV | 1–50 | 1–10 | (5) | 6 experiments. |
| B d | ID | 5–50 | 5–50 | | Do. |
| | IV | 2 | 2 | >5 | |
| B l | ID | 20 | 20 | 20 | 3 experiments. |
| | IV | 1 | >10 | 1–2 | |
| Isoxsuprine | ID | 10 | 10 | 10 | Do. |
| | IV | 0.1–0.2 | 0.2 | 0.1 | |
| | ID | 2 | 2 | >2 | |

[1] No.
[2] Inhibitory action.
[3] Not determined.
[4] No action.
[5] Substantially unchanged.

(3) Cardiovascular action: (A) venously in anesthetised cat.

| Isomer studied | Changes in arterial pressure and cardiac rhythm | Changes in mediators | | | | |
|---|---|---|---|---|---|---|
| | | Adrenaline | Noradrenaline | Histamine | Acetylcholine | Vagal excitability |
| A dl | Transient hypotension after 1 mg./kg. more accentuated after 3. Death at 10. Frequency of heart beat slightly accelerated. | Reduced | Reduced | Unchanged | Reduced after 3 mg./kg. | Reduced after 3 mg./kg. |
| A d | Transient hypotension from 0.3 to 3 mg./kg. very appreciable and longer lasting after 10 mg./kg. | Reversed after 1 mg./kg. | | | | |
| A l | Transient hypotension after 1 mg./kg. more appreciable after 10 or progressive drop. | Slightly reduced | | | | |
| B dl | Hypotension after 3 mg./kg. followed by progressive drop more accentuated after 10 mg./kg. | Reversed after 10 mg./kg. or 3 mg./kg. | Also reversed | Reduced after 10 mg./kg. | Unchanged up to 3 mg./kg. | Substantially unchanged. |
| B d | Transient hypotension after 0.3 to 1 mg./kg. more appreciable after 3 to 10. | Substantially unchanged. | | | | |
| B l | Drop after 3 or 10 mg./kg., transient in 1 case, longer lasting in the other. | Reduced after 3 mg./kg. Reversed after 10 mg./kg. | | | | |
| Isoxsuprine | Drop in arterial pressure from 0.01 to 0.08 mg./kg. (15–30 minutes for small doses) but several hours for higher doses (0.1 to 2 mg./kg.). | Reduced after 0.05 mg./kg. but reversed with larger doses. | Reduced | Unchanged | Unchanged | Unchanged. |

(B) Intraduodenal administration in anesthetised cat.

| Isomer studied | Action on arterial pressure | Changes in mediators | | | |
|---|---|---|---|---|---|
| | | Adrenaline | Noradrenaline | Histamine | Acetylcholine |
| B dl | No action up to 20 mg./kg. Appreciable and progressive drop from 50 mg./kg. | | | | |
| B d | Arterial pressure substantially unchanged | Progressively reduced. | Reduced | Reduced after 1 mg./kg. | Reduced after 1 mg./kg. |
| B l | Substantially unchanged pressure throughout | Reduced after 50 mg./kg. | Reduced from 50 mg./kg. | Reduced from 50 mg./kg. | Reduced after 50 mg./kg. |

It was also found that 3697 CB had a spasmolytic action upon the gall bladder and upon the ureter. Thus 3697 CB, form Bd, had the following actions in vitro:

On isolated guinea pig ureter, 3697 CB (form Bd) reduced the amplitude of contractions at a concentration of $1 \times 10^{-6}$ and completely stopped motoricity at a concentration of $1 \times 10^{-5}$.

On the isolated guinea pig bladder 3697 CB (form Bd) completely stopped motoricity and reduced tone at concentrations of about $1 \times 10^{-6}$ to $5 \times 10^{-6}$.

Comparison between the various isomers of 3697 CB and with isoxsuprine used as reference compound shows that:

(a) isomers of the group B of 3697 CB are the most active as uterine relaxing agents;

(b) isomers B are less toxic than isoxsuprine;

(c) isomers B are undoubtedly less active than isoxsuprine as uterine relaxing agents, but since they are less hypotensive their therapeutic use in disorders dependent upon treatment by uterus relaxing agents can be favourably considered.

Amongst these isomers B preference is given to the racemic form Bdl or the dextrorotatory form Bd.

The therapeutic indications resulting from the pharmacological activity of the product are conditions in which exaggerated uterine contractions have to be combated, e.g., dysmenorrhoea and the risk of miscarriage; 3697 CB can also be used in the treatment of spasms of the ureter and of the gall bladder.

The daily quantity of compound to be administered may be from 2 mg. to 500 mg. of base (preferably in salt form).

The compounds according to the invention can be combined with an excipient for oral administration or an excipient for parenteral administration for medicinal use.

Examples of pharmaceutical compositions are as follows:

(1) Tablets were made each of which contained

| | Mg. |
|---|---|
| 3697 CB B racemate (dl) (in form of fumarate, i.e., 107.31 mg. of fumarate) | 75 |
| Codeine phosphate | 9.60 |
| Acetylparaminophenol | 250 |
| Ethyl cellulose N 50 | 10 |
| Desiccated rice starch | 30 |
| Polyvinylpyrrolidone | 30 |
| Ultra-amylopectin "N" | 30 |
| Talc | 83.09 |
| Silicic acid | 5 |
| Paraffin oil | 15 |

(2) Ampoules were made each containing

| | |
|---|---|
| 3697 CB B dextrorotatory (d) mg | 50 |
| Lactic acid mg | 20 |
| Sodium hydroxide ... quantity sufficient to produce pH= | 5 |
| Distilled water ... quantity sufficient for ... ml | 1 |

(3) Tablets were made each of which contained

| | Mg. |
|---|---|
| 3697 CB B racemate (in form of fumarate, i.e., 107.31 mg. of fumarate) | 75 |
| Lactose | 62.69 |
| Rice starch | 40 |
| Polyvinylpyrrolidone | 20 |
| Talc | 15 |
| Magnesium stearate | 5 |
| Desiccated rice starch | 25 |
| Silicic acid | 5 |

In connection with the above examples, 3697 CB is advantageously combined with an analgesic, such as codeine, acetyl-para-aminophenol or phenacetin, for the treatment of dysmenorrhoea, whilst codeine reinforces the action of 3697 CB against uterine contractions.

In the foregoing example of compositions, 3697 CB is stated to be present in the form of the fumarate thereof but generally it may be present in the form of one of the acid addition salts thereof derived from pharmaceutically acceptable acids such as inorganic acids, for example hydrochloric acid, sulphuric acid, phosphoric acid and the like, or organic acids, for example acetic acid, formic acid, succinic acid, maleic acid, fumaric acid, lacetic acid, ascorbic acid, citric acid, glutonic acid, aminoacetic acid, glutamic acid, levulinic acid and the like, or complex organic acids such as tannic acid, embonic acid, pectins and pectic acids and the derivatives thereof, polyacrylic acids (carbopoles), resins having an acid character and like compounds capable of yielding with basic amino compounds sparingly soluble salts which liberate the active substance slowly at the site of intestinal mucous membrane so as to protract the activity thereof.

Tablets incorporating the herein described substituted benzedrines may be produced according to conventional double compression or granulation techniques, using a gum aqueous solution or a non-aqueous solvent such as ethyl alcohol. Suitable carriers include for example starch, talcum, gum-arabic, magnesium stearate, carboxymethyl cellulose and the like. The tablets may be made enteric for example by providing them with a gluten coating or a coating with another substance unaffected by gastric juice such as cellulose acetophthalate, with a view to preventing the active substance to be attacked by gastric hydrochloric acid or again with a view to avoiding possible stomach troubles. The tablets may also be given a sugar or other outer coating, which may be opaque and may be coloured if desired.

What we claim is:

1. The method of relieving exaggerated uterine contractions in female patients exhibiting exaggerated uterine contractions which comprises the step of administering to said patient a therapeutically administrable form of the B isomeric forms of N-(2-phenyl-1-methylethyl) 2-phenoxy-1-methylethylamine in an amount sufficient to supply 2 to 500 mgm. of said amine per day.

References Cited

UNITED STATES PATENTS 3,056,836  10/1962  Moed  260—570.7

ALBERT T. MYERS, *Primary Examiner.*

S. J. FRIEDMAN, *Assistant Examiner.*

U.S. Cl. X.R.

260—501, 566, 570.6, 570.5, 570.7